US008331966B2

(12) United States Patent
Anzures et al.

(10) Patent No.: US 8,331,966 B2
(45) Date of Patent: Dec. 11, 2012

(54) CONTENT SELECTION BASED ON SIMULCAST DATA

(75) Inventors: Freddy A. Anzures, San Francisco, CA (US); Henry Mason, Santa Clara, CA (US); Lucas Newman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 383 days.

(21) Appl. No.: 12/467,206

(22) Filed: May 15, 2009

(65) Prior Publication Data

US 2010/0291861 A1 Nov. 18, 2010

(51) Int. Cl.
*H04B 15/00* (2006.01)

(52) U.S. Cl. ........................................................ 455/503

(58) Field of Classification Search .................. 455/502, 455/503, 456.1, 456.6
See application file for complete search history.

(56) References Cited

U.S. PATENT DOCUMENTS 4,969,209 A 11/1990 Schwob
5,864,753 A 1/1999 Morita et al.
6,289,207 B1 9/2001 Hudecek et al.
6,505,088 B1 1/2003 Simkin et al.
6,611,678 B1 8/2003 Zweig et al.
6,697,631 B1 2/2004 Okamoto
6,748,237 B1 6/2004 Bates et al.
7,313,359 B2 * 12/2007 Steelberg et al. ............ 455/3.06
7,346,320 B2 3/2008 Chumbley et al.
7,369,825 B2 5/2008 Slupe
7,499,683 B2 3/2009 Ogasawara
7,551,889 B2 6/2009 Quelle
7,587,185 B2 9/2009 Nee
7,643,807 B2 * 1/2010 Gupta et al. ............... 455/179.1
7,787,407 B2 * 8/2010 Kostic et al. .................. 370/312
7,787,818 B2 8/2010 Shapiro et al.
7,844,301 B2 11/2010 Lee et al.
7,853,664 B1 12/2010 Wang et al.
7,929,931 B2 4/2011 Nakamura et al.
7,962,162 B2 * 6/2011 McNair ......................... 455/503
8,095,086 B2 * 1/2012 Noeske et al. ................ 455/110
8,165,142 B2 * 4/2012 Karaoguz et al. ............. 370/401
2001/0035087 A1 11/2001 Subotnick
2003/0040272 A1 2/2003 Lelievre et al.

(Continued)

FOREIGN PATENT DOCUMENTS

EP 0 964 516 12/1999
JP 02-153415 6/1990
WO WO 2008/027836 3/2008

OTHER PUBLICATIONS

Anzures et al., "Processing Simulcast Data", U.S. Appl. No. 12/467,223, filed May 15, 2009.

(Continued)

*Primary Examiner* — Brian Young
(74) *Attorney, Agent, or Firm* — Blakely, Sokoloff, Taylor & Zafman LLP

(57) ABSTRACT

A computer system receives information snippets from a mobile device. The information snippets are extracted from a simulcast of a data stream of a radio broadcast received on the mobile device. The system identifies content metadata from the information snippets. The content metadata describes one or more features of the radio broadcast. The system selects a radio station from a radio station repository based on attributes of the radio station. One of the selection criteria is that the attributes of the radio station match at least a portion of the content metadata. The system presents a reference to the radio station to the mobile device as a recommendation.

27 Claims, 11 Drawing Sheets

U.S. PATENT DOCUMENTS

| | | | |
|---|---|---|---|
| 2007/0142055 | A1 | 6/2007 | Toivanen et al. |
| 2007/0259685 | A1 | 11/2007 | Engblom |
| 2008/0065722 | A1 | 3/2008 | Brodersen et al. |
| 2008/0119148 | A1 | 5/2008 | Ray |
| 2008/0198141 | A1 | 8/2008 | Lee et al. |
| 2009/0093300 | A1 | 4/2009 | Lutnick et al. |
| 2009/0239573 | A1 | 9/2009 | Kretz |
| 2010/0004031 | A1 | 1/2010 | Kim |
| 2010/0033422 | A1 | 2/2010 | Mucignat |

OTHER PUBLICATIONS

Anzures et al., "Accelerometer-Based Control for Radio Broadcast Receivers", U.S. Appl. No. 12/467,179, filed May 15, 2009.

Anzures et al., "Radio Receiver", U.S. Appl. No. 12/475,860, filed Jun. 1, 2009.

* cited by examiner

CONTENT SELECTION BASED ON SIMULCAST DATA

RELATED APPLICATIONS

This application is related to U.S. patent application Ser. No. 12/467,223, for "PROCESSING SIMULCAST DATA," filed May 15, 2009, which patent application is incorporated by reference herein in its entirety.

BACKGROUND

This disclosure relates to processing simulcast data.

In some radio broadcasting protocols, data can be transmitted simultaneously (simulcast) with broadcast content. For example, Radio Data System ("RDS") is a simulcast protocol that allows data to be transmitted simultaneously with content in FM (Frequency Modulation) broadcast. RDS operates by adding data to a baseband signal that is used to modulate a radio frequency carrier. In some implementations of RDS broadcasting, the baseband signal has a number of components. Normal modulated audio signal that includes a left plus right (L+R) component is transmitted from 0 to 15 kHz (relative to the baseband). A stereo difference signal (L−R) component is transmitted on a 38 kHz subcarrier. RDS information (e.g., data) is transmitted on a 57 kHz subcarrier. Data are modulated and transferred at 1187.5 bits per second. RDS data can include free-form text that, after demodulation, can be displayed on a display device.

SUMMARY

A computer system receives information snippets from a mobile device. The information snippets are extracted from a simulcast of a data stream of a radio broadcast received on the mobile device. The system identifies content metadata from the information snippets. The content metadata describes one or more features of the radio broadcast. The system selects a radio station from a radio station repository based on attributes of the radio station. One of the selection criteria is that the attributes of the radio station match at least a portion of the content metadata. The system presents a reference to the radio station to the mobile device as a recommendation.

The details of one or more implementations of processing simulcast on mobile devices are set forth in the accompanying drawings and the description below. Other features, aspects, and advantages of processing simulcast on mobile devices will become apparent from the description, the drawings, and the claims.

BRIEF DESCRIPTION OF THE DRAWINGS

Like reference symbols in the various drawings indicate like elements.

DETAILED DESCRIPTION

Overview of Processing Simulcast Data

Figure 1:
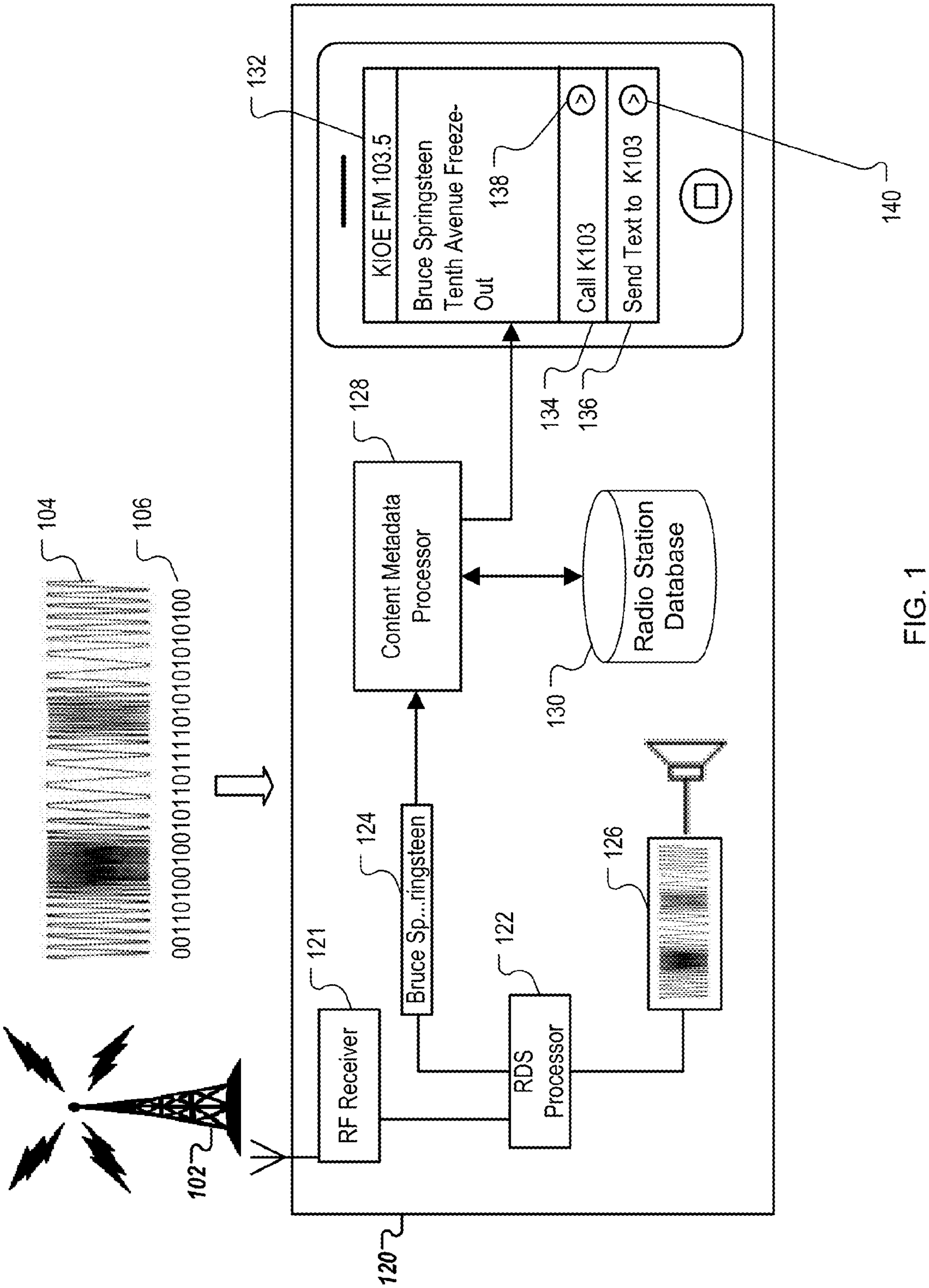
FIG. 1 is an overview of some exemplary implementations of processing simulcast data on a mobile device.

FIG. 1 is an overview of some exemplary implementations of processing simulcast data 106 on a mobile device 120. A simulcast is a simultaneous broadcast of content and metadata. Some implementations of a radio simulcast can be an RDS protocol or a Radio Broadcast Data System ("RBDS") protocol. The RBDS is a U.S. version of the RDS, and is nearly identical to the RDS, except in a number of areas (e.g., number assignments in program formats). In this specification, the terms "RDS" and "RBDS" are used interchangeably except when otherwise noted.

A radio station 102 can provide simulcast (e.g., RDS broadcast). In this specification, the term "radio station" refers to a system where content (e.g., audio content, visual content, and data) is transmitted from a transmitter as electromagnetic waves, to be received by an antenna on a receiving device. The term "radio broadcast" refers to any transmission of content from a transmitter as electromagnetic waves. Thus, the term "radio broadcast" can include, for example, audio content broadcast, visual content (e.g., TV) broadcast, in digital or analog format, by land-based, mobile, or satellite radio stations. The simulcast from the radio station 102 can include main content (e.g., a music piece) 104 and a data stream 106 which can be modulated (e.g., converted from digital into analog form) and transmitted on a subcarrier (e.g., a separate signal carried on a main transmission). The data stream 106 can contain information that includes a program type (e.g., news, drama, rock music, etc.), a program service name (e.g., the name of the radio station), and free-form information (e.g., radio text). The free-form information can be displayed on a display screen of a RDS enabled radio. The free-form information can contain one or more information snippets (e.g., text segments, compressed text, numeric values, etc.) that, when parsed and assembled, can indicate a title of the main content (e.g., a title of a song being played), a name of a performer of the main content (e.g., a name of an artist singing the song), etc.

A mobile device 120 that includes a radio frequency ("RF") receiver 121 and an RDS processor 122 can receive the main content 104 and the data stream 106. The RDS processor 122 can separate the subcarrier from the main content. The main content (e.g., a song) is sent to an audio processing unit 126 and is played on the mobile device 120. The RDS processor 122 can demodulate the subcarrier to extract information snippets 124 from the RDS broadcast. In RDS broadcast, condition of signals received can vary greatly. For example, when the mobile device 120 is in a moving car, the signal received can be poor due to interferences from various electronic components in the car as well as the location of the car (e.g., in a tunnel). The RDS processor 122 can have built-in error correction functions. However, the reliability of the built-in error correction mechanism can vary. Therefore, the extracted information snippets 124 can be in pieces, instead of an entirety, of the original broadcast data stream (e.g., "Bruce Springsteen" can appear in two segments as "Bruce Sp" and "ringsteen").

The RDS processor 122 can send the information snippets 124 to a content metadata processor 128 for processing. The content metadata processor 128 can analyze the information snippets 124 and extracts information from the information snippets 124. The extracted information can be stored in a content metadata data structure. Content metadata describes a broadcast and the content of the broadcast. The content metadata data structure can have multiple components (e.g., data fields) that corresponds to information fields contained in the RDS data. RDS data can contain various information fields such as clock time, program identification code, a program service name, a program type (e.g., PTY 10, which stands for "pop music" in RDS and "country" in RBDS), free-form information (e.g., radio text), etc. The content metadata components can each contain a corresponding RDS data field. The content metadata can also contain other components that describe the main content being broadcast (e.g., the name of the artist playing the song, the title of the song, etc.). The name, title, etc. can be extracted, for example, by analyzing the free-form information (e.g., radio text) field of the RDS data.

In some implementations, the content metadata processor 128 can identify contact information on the radio station 102 from reference data stored in a radio station database 130. The radio station database 130 is a database that contains one or more phone numbers, Short Message Service ("SMS") identifications, email addresses, Uniform Resource Locator ("URL") links, and other contact information which can be organized based on the call sign (e.g., a unique identification of a radio station) or program identification code of each radio station. The radio station database 130 can reside on a remote server (e.g., a server at a mobile service provider) to which the mobile device can be connected through a communications network. Alternatively, the radio station database 130 can also reside on the mobile device 120 (e.g., after being downloaded from or synchronized by the remote server).

After contact information of the radio station 102 is identified, a user interface can be displayed on a user interface 132 (e.g., a touch-sensitive user interface) of the mobile device 120. On example user interface 132, a call sign (e.g., "KIOE"), or alternatively a radio station name (e.g., "K103") and a radio frequency (e.g., "FM 103.5") of the radio station 102 are displayed. Also displayed is information about the main content being played on the mobile device 120 (e.g., a name of a performer "Bruce Springsteen," a title of the song being played "Tenth Avenue Freeze-Out," etc.), and user interface 134 and 136 for opening communication channels to the radio station 102. A user of the mobile device 120 can tap or otherwise touch the user interface 134 to call the radio station 102. The user can also tap the user interface 136 to open up a messaging interface so that the user can send a text message to the radio station 102. Other communication channels can include emails to the radio station 102 or an interactive Web page of the radio station 102.

The mobile device 120 can display the user interface 134 and 136 while playing the main content. A user can quickly access a communication channel and call, send text message to, or send email to the radio station 102 for purposes of entering a contest (e.g., "the first 25 caller to the station gets a prize"), voting on a song or a performer, or reporting a traffic situation (e.g., to a traffic reporting radio station). The user can access more details to the communication channels by, for example, tapping or otherwise touching a detailed information icon 138 or 140. Tapping or otherwise touching a detailed information icon 138 or 140 can cause the mobile device 120 to display, for example, the actual phone number, SMS ID, or email address of the radio station 102, and/or options to add the phone number, SMS ID, or email address to a contact list or address book.

Various Implementations

Figure 2B:
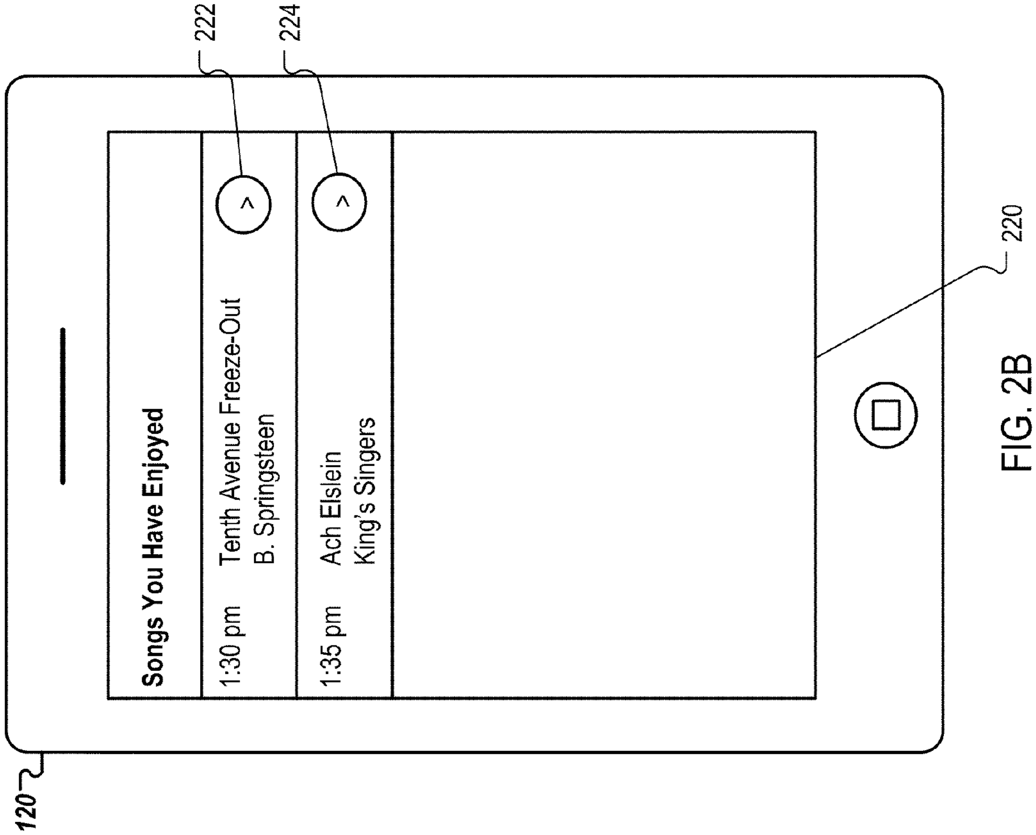
FIGS. 2A-2D illustrate exemplary user interfaces in various exemplary implementations of processing simulcast data.
Figure 2A:
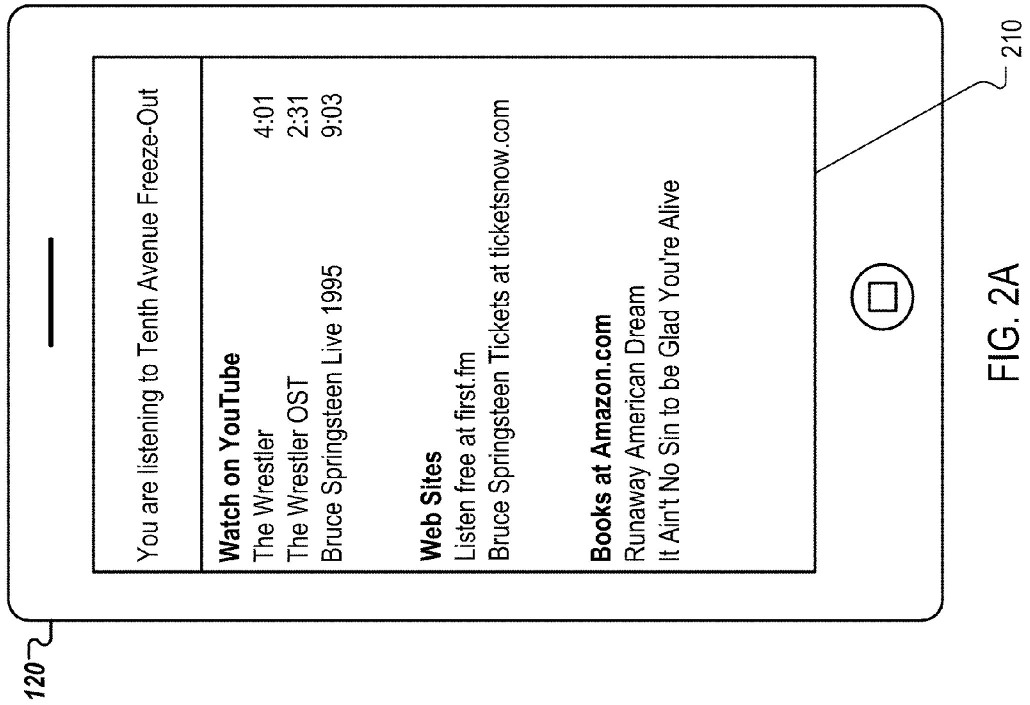

FIGS. 2A-2D illustrate exemplary user interfaces in various exemplary implementations of processing simulcast data. FIG. 2A illustrates an exemplary user interface 210 where information that is relevant to broadcast content is displayed on a mobile device 120. In FIG. 2A, the mobile device 120 is playing broadcast content (e.g., a song "Tenth Avenue Freeze-Out" by Bruce Springsteen). A simulcast data stream (e.g., RDS data) is received by the mobile device 120. The mobile device extracts information snippets 124 from the data stream. The mobile device 120 can perform one or more searches using the information snippets 124. The information snippets 124 can be used as search terms in one or more search queries. The search queries can be sent to a search engine on a network.

The search engine on the network can retrieve search results (e.g., groups of relevant sources) that are related to the information snippets 124. For example, the search engine can retrieve YouTube movie clips by or about an artist identified in the information snippets 124 (e.g., movies by or about Bruce Springsteen). The search engine can also retrieve Web sites and book titles. The retrieved search results can be displayed in groups (e.g., "Watch on YouTube," "Web Sites," or "Books at Amazon.com") in the user interface 210. Each search result in the user interface 210 can be actionable. For example, a user can tap on a search result (e.g., a link to "The Wrestler" movie clip on YouTube) on a touch-sensitive display screen and watch the YouTube video clip in a viewer application or browse a Web page in a Web browser that is compatible with the mobile device 120 (e.g., Safari® by Apple Inc.).

In some implementations, the data stream 106 and the information snippets 124 can contain advertising information. For example, in the radio text section of RDS data, a radio station can send names, phone numbers, and links to advertisers. On a conventional RDS receiver, the advertising information can be displayed as a static or scrolling text string. On mobile device 120, the advertiser information can be blended into the grouped search results and made interactive. For example, radio station 102 can broadcast Bruce Springsteen's song "Tenth Avenue Freeze-Out" with an advertisement from "ticketsnow.com" in the radio text section of associated RDS data. The text of the advertisement is "Bruce Springsteen Tickets at ticketsnow.com." The mobile device 120 can identify the string "ticketsnow.com" as an actionable link. Therefore, the mobile device 120 can display the text "Bruce Springsteen Tickets at ticketsnow.com" on the user interface 210, together with other web pages under a section "Web Sites."

FIG. 2B illustrates an exemplary user interface 220 where a listening history is displayed. When the mobile device 120 plays broadcast content 104, the mobile device can receive a simulcast data stream 106 (e.g., RDS data). The data stream can contain an information field for clock time. The clock time information field in RDS data can be used to synchronize a clock (e.g., an internal clock of the mobile device 120). The mobile device 120 can extract the clock time information and include the extracted information in a record as a timestamp indicating that a user of the mobile device 120 has played the content 104 at the recorded time. The metadata of the content played, together with the timestamp, can be recorded as listening history on a storage device that is internal to the mobile device 120 or on a server to which the mobile device is connected through a communications network. The listening history can be displayed on a user interface 220 upon request by a user or application.

In some implementations, the metadata of the content 104 are recorded with a timestamp when the content 104 has played on the mobile device 120 for a sufficiently long period of time (e.g., one minute). The period of time can be used as a threshold to filter out radio stations and contents that the user has merely browsed through (e.g., listens to for a few seconds before tuning to another radio station) instead of actually listened to.

In some implementations, titles of the content and names of artists playing the content are displayed in the listing history on the user interface 220. Radio station call signs, names, and frequencies can also be displayed in the list. A user can tap a call sign, a name, or a frequency to tune the mobile device 120 to the radio station. A user can tap on detailed information buttons 222 and 224 on a touch-sensitive display screen to view details of the content played. The details can include information retrieved from the information snippets of the data stream (e.g., lyric writer, music composer, etc.). The details can also include related information as described above with respect to FIG. 2A.

Figure 2C:
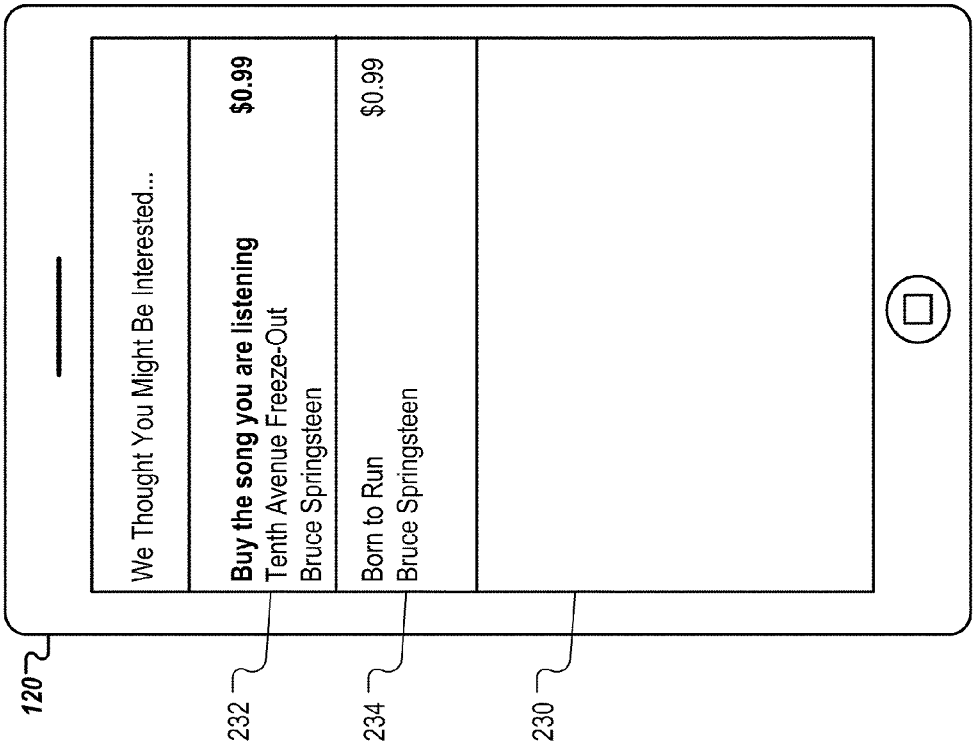

FIG. 2C illustrates an exemplary user interface 230 where purchasing recommendations are displayed on the mobile device. For convenience, the exemplary user interface 230 will be described with respect to a server that implements techniques for processing simulcast data and recommending content for purchase.

In some implementations, a mobile device 120 is playing broadcast content (e.g., song "Tenth Avenue Freeze-Out" performed by Bruce Springsteen). A simulcast data stream (e.g., RDS data) is received by the mobile device 120. The mobile device 120 extracts information snippets 124 from the data stream. The mobile device 120 sends the information snippets 124 to the server. The server extracts content metadata from the information snippets 124. The extracted content metadata can include information on the broadcast content such a title of the broadcast content, a performer, a composer, a lyric writer, etc. The server can use the information to locate matching content (e.g., matching songs) stored in a content repository 744, as described in reference to FIG. 7.

A content provider can maintain the content repository 744 for a large amount of audio work (e.g., music pieces), video work (e.g., movies), or other work (e.g., books, recipes, games and other digital content or software applications). The content repository 744 can be hosted on one or more computers of the server or on one or more content providers accessible through a communications network. The content repository 744 can have various indices that can be used to match various components in the content metadata. The server can display matching content (e.g., a song that has the same title as the one currently playing on the mobile device 120, or a song played by the same artist) as well as the purchase prices of the songs on the user interface 230 of the mobile device 120. A user can tap the matching content 232 or 234 (e.g., a name of a song, or a purchase price of the song) on a touch-sensitive display device to purchase and download the content.

Figure 2D:
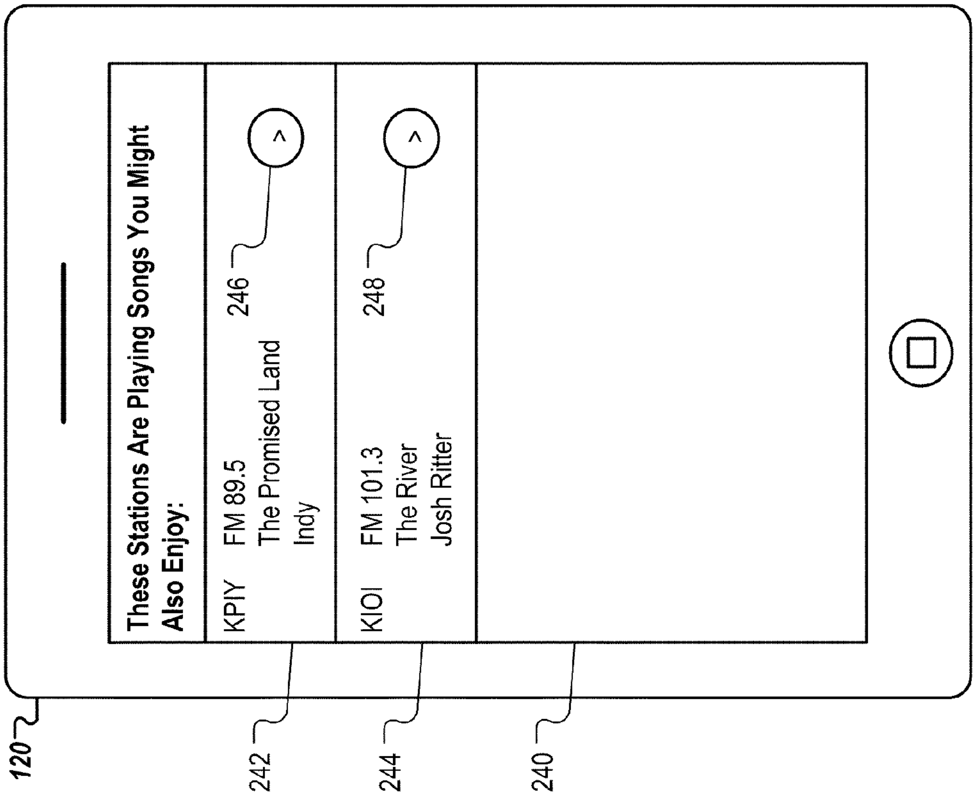

FIG. 2D illustrates an exemplary user interface 230 where radio station recommendations are displayed on a mobile device 120. For convenience, the exemplary interface 230 will be described with respect to a server that implements techniques for processing simulcast data and recommending radio stations.

In some implementations, the mobile device 120 is playing broadcast content (e.g., a song "Tenth Avenue Freeze-Out" performed by Bruce Springsteen). A simulcast data stream (e.g., RDS data) is received by the mobile device 120. The mobile device 120 extracts information snippets 124 from the data stream. The mobile device 120 sends the information snippets 124 to the server. The server extracts content metadata from the information snippets 124. The extracted content metadata can include an identification of the radio station that is making the broadcast (e.g., a program service name and frequency of the radio station the mobile device is tuned to) and information on the broadcast content (e.g., a title of the broadcast content, a performer, a composer, a lyric writer, etc.) The server can use the information to identify one or more radio stations that are broadcasting content that is similar to the content playing on the mobile device 120 and recommend those radio stations in a user interface 240 on the mobile device 120.

In some implementations, the server maintains a radio station repository 740 that contains radio stations' call signs, frequencies, and genres. A genre of a radio station can be a music category (e.g., "country"), or a scoring system that is based on, for example, performers or composers whose work is most-played on the radio station, music categories of songs that are most played on the radio station, etc. The server can match genres of radio stations in the radio station repository 740 with the genre of the current radio station into which the mobile device 120 is tuned. The server can select one or more best-matching radio stations (e.g., whose genres are the same as or similar to the current radio station) and send information (e.g., call sign, frequency) of the selected radio stations as recommendations to the mobile device 120. The mobile device can display the received recommendations on a user interface 240. A user can tap or otherwise touch an area 242 or 244 that contains the station name on a touch-sensitive display device to interrupt a current reception and tune into a recommended radio station (e.g., KPIY at FM 89.5 MHz). The user can interrupt a current reception and tune into a recommended radio station for a variety of reasons. For example, the user can change stations when the user has traveled outside of a strong reception range of the current station.

A user can access details of a recommended radio station by tapping or touching a detailed information button 246 or 248. Tapping or touching a detailed information button 246 or 248 can cause the user interface 240 to switch to a detailed display screen that includes, for example, contact information of the recommended station, a title of currently playing content at the recommended station, signal strength, and a virtual dial or virtual bar that mimics an actual tuning control on a radio. The user can turn the dial or move the bar by moving one or more fingers across the display screen to access broadcast from the recommend station or another station.

In some implementations, the server can recommend a radio station not only based on the genre of the radio station, but also by the currently playing content on the radio station. The station that plays content that most closely matches the content to which the user is listening is recommended. For example, the user is listening to "Tenth Avenue Freeze-Out" by Bruce Springsteen on radio station KIOI at FM 101.3. Another station KPIY is playing "The Promised Land" by Indy. The songs are performed by the same artist (Springsteen). The system therefore can recommend station KPIY on a display area 242 on the user interface 240 of mobile device 120, even when station KPIY is not in the same genre of KIOI.

Exemplary Mobile Device Architecture

Figure 3:
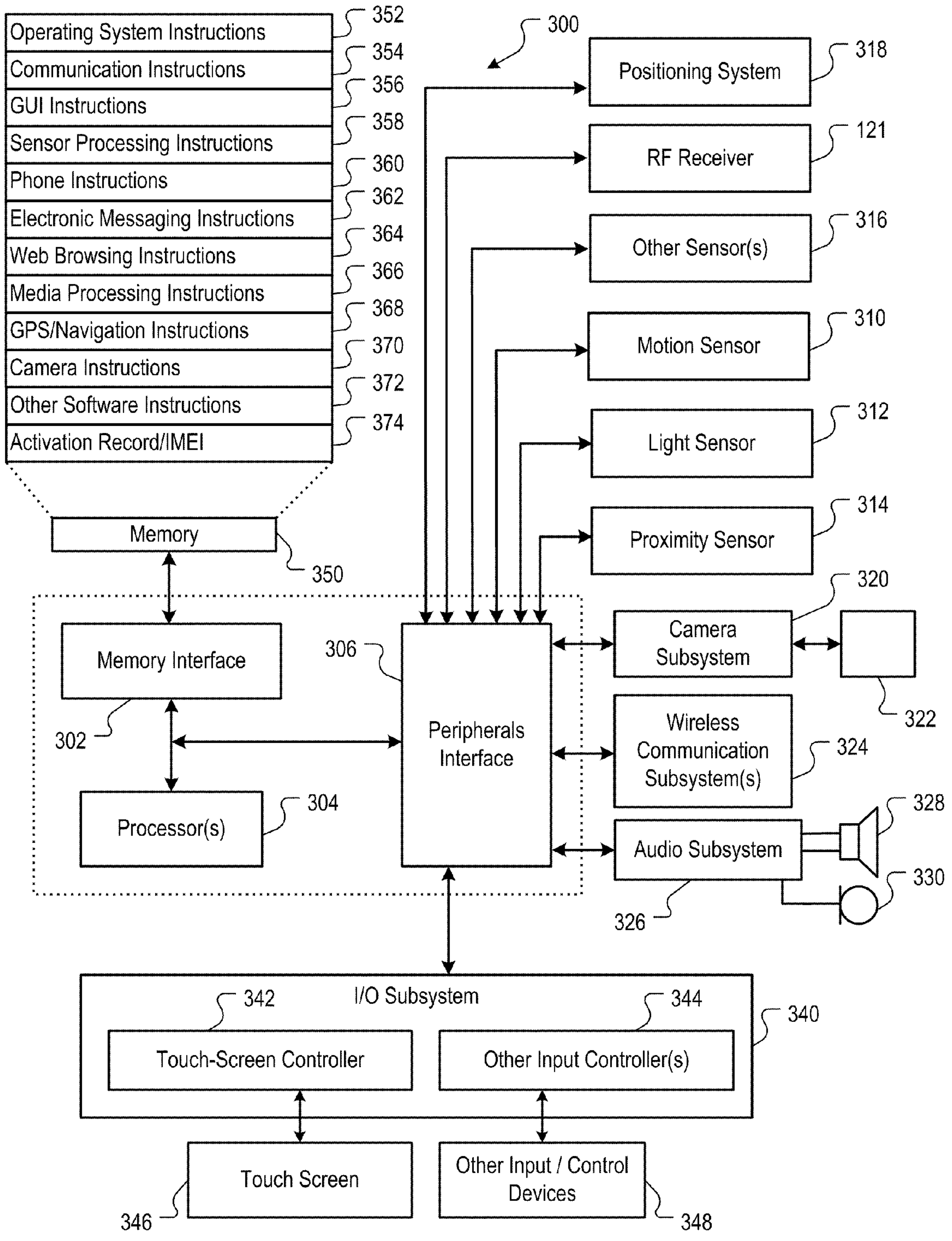
FIG. 3 illustrates an example system architecture of the example mobile device of FIGS. 1 and 2A-2C.

FIG. 3 illustrates an example system architecture 300 of the example mobile device 120 of FIGS. 1 and 2A-2D. The mobile device 120 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 120 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions. Other sensors 316 can also be connected to the peripherals interface 306, such as a temperature sensor, a biometric sensor, or other sensing device, to facilitate related functionalities.

In some implementations, the mobile device 120 can receive positioning information from a positioning system 318. The positioning system 318, in various implementations, can be built into the mobile device 120, or can be coupled to the mobile device 120 (e.g., using a wired connection or a wireless connection). In some implementations, the positioning system 318 can include a GPS receiver and a positioning engine operable to derive positioning information from received GPS satellite signals. In other implementations, the positioning system 318 can include a compass and an accelerometer, as well as a positioning engine operable to derive positioning information based on dead reckoning techniques. In still further implementations, the positioning system 318 can use wireless signals (e.g., cellular signals, IEEE 802.11 signals, etc) to determine location information associated with the mobile device, such as those provided by Skyhook Wireless, Inc. of Boston, Mass. Hybrid positioning systems using a combination of satellite and television signals, such as those provided by Rosum Corporation of Mountain View, Calif., can also be used. Other positioning systems are possible.

In some example models of mobile device 120, a camera subsystem 320 and an optical sensor 322, e.g., a charged coupled device (CCD) or a complementary metal-oxide semiconductor (CMOS) optical sensor, can be utilized to facilitate camera functions, such as recording photographs and video clips. In some other example models of mobile device 120 that do not have camera capability, camera subsystem 320 and an optical sensor 322 can be absent.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communications network(s) over which the mobile device 120 is intended to operate. For example, mobile device 120 can include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 120 can be configured as a base station for other wireless devices.

Broadcast reception functions can be facilitated through one or more RF receivers 121. An RF receiver can receive, for example, AM/FM broadcast or satellite broadcast (e.g., XM® or Sirius® radio broadcast). An RF receiver can also be a TV tuner. In some implementations, an RF receiver 121 is built into the communication subsystems 324. In other implementations, an RF receiver 121 is an independent subsystem coupled to the mobile device 120 (e.g., using a wired connection or a wireless connection). The RF receiver 121 can be capable for receiving simulcasts. In some implementations, the RF receiver 121 can include an RDS processor 122, which can process broadcast content (which can be relayed to the audio subsystem 326) and simulcast data (e.g., RDS data), which can be relayed to a content metadata processor 128. In some implementations, the RF receiver 121 can be digitally tuned to receive broadcasts at various frequencies. In some implementations, the RF receiver 121 can have a scanning function that tunes up or down and pauses at a next frequency where broadcast content is available.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In some implementations, a pressing of the button for a first duration may disengage a lock of the touch screen 346; and a pressing of the button for a second duration that is longer than the first duration may turn power to the mobile device 120 on or off. The user may be able to customize a functionality of one or more of the buttons. The touch screen 346 can also be used, for example, to implement virtual or soft buttons and/or a keyboard.

In some implementations, the mobile device 120 can present recorded audio and/or video files, such as MP3, AAC, and MPEG files. In some implementations, the mobile device 120 can include the functionality of an MP3 player, such as an iPod™. The mobile device 120 can, therefore, include a 30-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory. The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can include a kernel (e.g., a UNIX kernel or an XNU kernel).

Memory 350 can also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; and/or other software instructions 372 to facilitate other processes and functions.

Memory 350 can also include a preferences engine 374. The preferences engine 374 can be operable to receive user preferences as to the sorts of content the user is interested. In some implementations, the preferences can be used to filter the sorts of information that is sent to the mobile device 100. For example, the user might indicate a preference for local music. Thus, when local music is available the mobile device 100 can retrieve available local music. In another example, the user might indicate a preference not to receive video, route or image content when in a specified area (e.g., hometown, familiar city, etc.), but to receive route and image content when outside of their specified area. These preferences can be communicated to a media service, and can be used by the media service to provide relevant media content based on location and/or preferences.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Communicating to a Radio Station

Figure 4A:
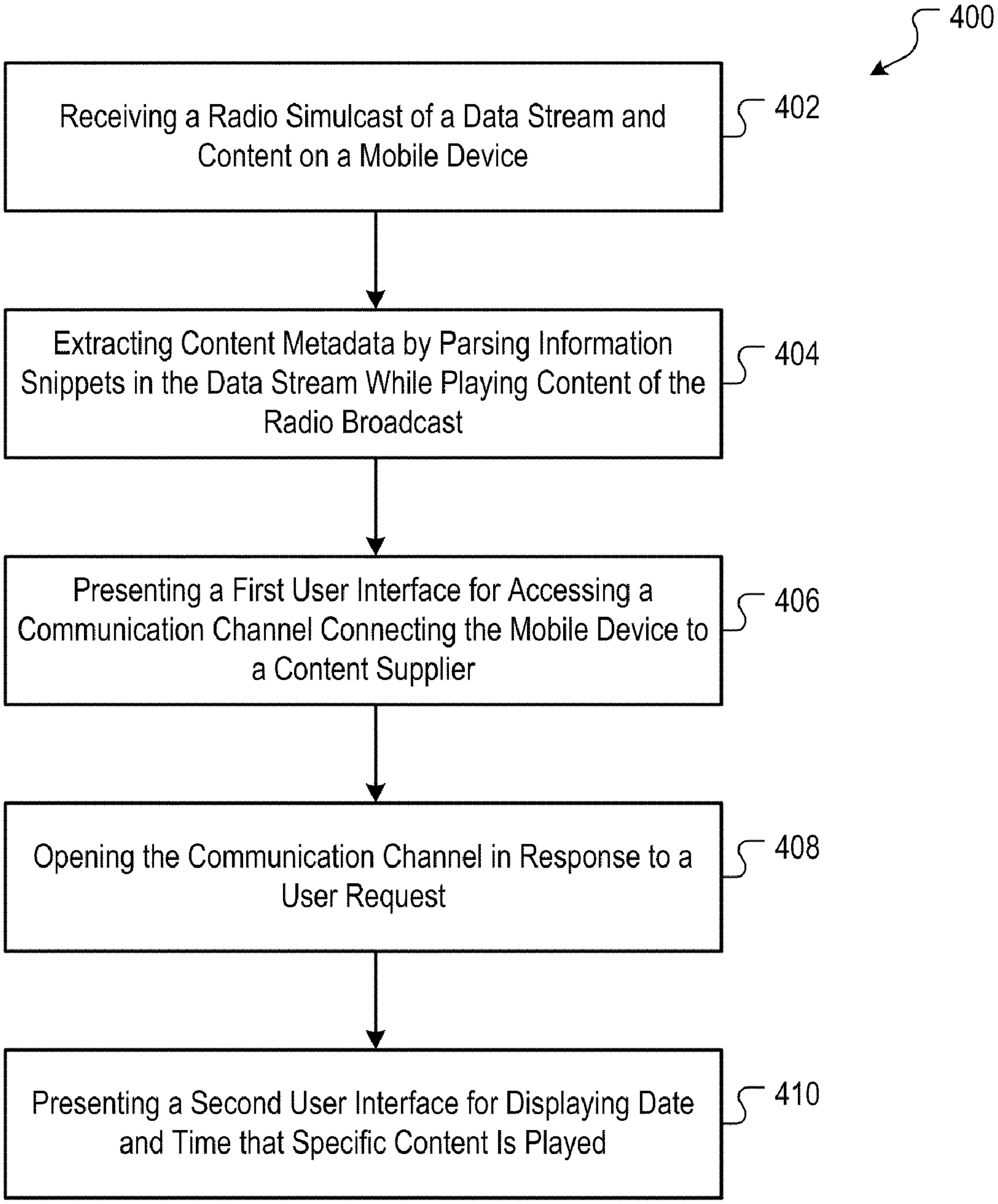
FIGS. 4A and 4B are flowcharts illustrating exemplary processes for processing simulcast data.
Figure 4B:
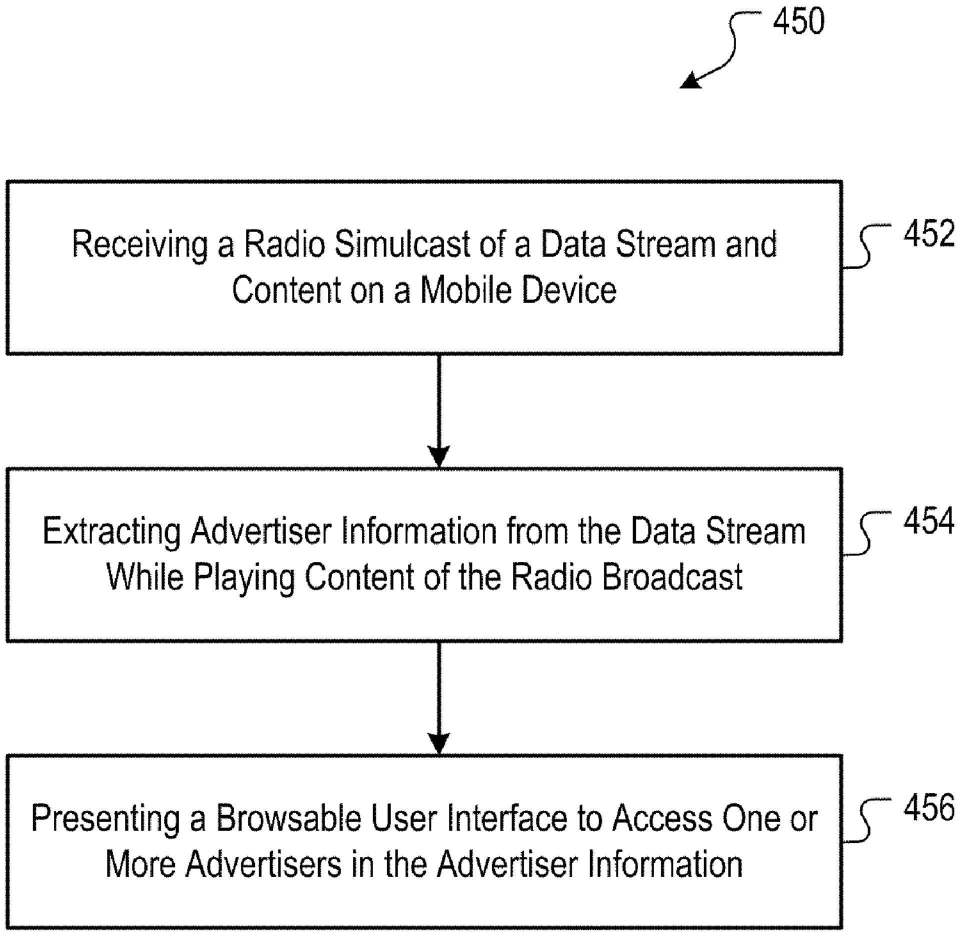

FIGS. 4A and 4B are flowcharts illustrating exemplary processes for processing simulcast data. FIG. 4A is a flowchart illustrating an exemplary process for using simulcast data to open a communication channel to a radio station. In a step 402, a simulcast is received on a mobile device 120. The mobile device 120 can be, for example, a handheld computer, a personal digital assistant (PDA), a cellular telephone, a network appliance, a camera, a smart phone, an enhanced general packet radio service (EGPRS) mobile phone, a network base station, a media player, a navigation device, an email device, a game console, or a combination of any two or more of these data processing devices and/or other data processing devices. The mobile device 120 can wirelessly connect with an external or unsecured network. In some other examples, the mobile device 120 can include a laptop that includes an input device, such as a keypad, touch screen, one or more scroll wheels, one or more buttons or other device that can accept information, and an output device that conveys information, including digital data, visual information, and audio information.

The mobile device 120 can include an RF receiver 121 that can be tuned to receive broadcast content in example frequencies that include Medium Frequency ("MF," e.g., 530 kHz to 1,650 kHz AM radio), High Frequency ("HF," e.g., some shortwave radio), Very High Frequency ("VHF," e.g., 88-108 MHz FM radio, and some TV channels), Ultra High Frequency ("UHF," e.g., some TV channels), and S Band radio frequencies (e.g., XM® or Sirius® satellite radio channels).

A multicast of data stream can accompany the broadcast content (e.g., under RDS protocol). The RF receiver 121 in the mobile device 120 can include, or be coupled with, an RDS processor 122 that can extract information snippets 124 from the data steam 106 that accompanies the broadcast content 104. The data stream 106 can include modulated information on alternative frequencies ("AF"), clock time ("CT"), program service ("PS"), program type ("PTY"), radio text ("RT"), and other information. Some information in the data stream 106 can be segments of text strings. For example, in RDS transmission, the PS field permits a radio station to transmit an eight-character text string. The RT field permits a radio station to transmit a 64-character free-form text string. Due to various qualities of the transmission and reception (e.g., due to weather condition, motion of the mobile device 120, location of the mobile device 120, etc.), the mobile device can receive one or more information snippets 124 (e.g., segments of eight to ten characters, "Bruce Sp" and "ringsteen").

In a next step 404, the mobile device 120 can extract content metadata from the information snippets 124 by parsing the information snippets 124 while playing content 104 of the radio broadcast. Extracting content metadata can include identifying from the information snippets 124 a program type, a title of the content being broadcast, a name of a performer of the content, a composer of the content, and an identifier identifying the broadcasting radio station. Extracting content metadata can include identifying meaningful information from the information snippets 124 of the free-form text (e.g., determining that "Bruce Sp" and "ringsteen" actually mean artist "Bruce Springsteen").

In some implementations, a content metadata processor 128 buffers the information snippets. One reason for buffering the information snippets is data transmission speed and quality. RDS data are transmitted at a rate of 1187.5 bits per second. The data contain information (in 16-bit segments) and check words (in 10-bit segments). Therefore, the mobile device can receive information snippets (e.g., text strings) at a maximum rate of less than 100 characters per second. Because the information snippets received can contain errors, the content metadata processor 128 can decide to parse the information snippets (e.g., text strings of the RT data field) after the entire text field (e.g., 64 characters) is received. Therefore, the content metadata processor 128 stores (e.g., buffers) the partial text strings until the RT data field is completely received.

In some implementations, a content metadata processor 128 performs real-time (on-the-fly) text analysis as soon as an entire data field (e.g., an RT data field or a PS data field) is received. The data fields in some RDS transmissions (e.g., in RBDS) can be dynamic. For example, a radio station can transmit a PS field in an RDS transmission that includes the call sign letters of the radio station (e.g., "KIOI"), which can be inaccurate upon reception (e.g., into "KI#I"). The radio station can transmit other characters in the same PS data field in subsequent transmissions (e.g., "get up," "and," and "dance!"). When the content metadata processor 128 receives these strings segments, the content metadata processor 128 can analyze the segments and determine whether the string in the PS field is a content metadata component. The analysis can include looking up the text in the PS data field in a radio station database 130. If the text in the PS field does not correspond to a call sign of a station in the radio station database 130, the content metadata processor 128 can discard the text and wait for a next transmission of the PS field.

In some implementations, the content metadata processor 128 can perform a search to determine the call sign of a radio station if the text in a PS data field contains sufficient information that can be used in a search query submitted to a search engine to identify the radio station. In some implementations, the content metadata processor 128 performs a search when the text in the PS data field starts with a letter W or K (which are the beginning letters of call signs in the United States) and contain four or six letters in total (which makes it likely that the text is a call sign, which often contains four to six letters). The content metadata processor 128 therefore can perform a search based on the letter received, the frequency that the mobile device 120 is currently tuned to, and/or a location of the mobile device (which can be determined by the positioning system 318). For example, when a content metadata processor 128 receives text string "KI#I" and a radio receiver in the mobile device 120 is tuned to FM 101.3, the content metadata processor 128 can perform a search using query term "KI?I" (where the "?" is a wildcard by using an Internet search engine (e.g., http://www.radio-locator.com), and determine that the "KI#I" refers to "KIOI" at FM 101.3 in San Francisco Bay Area.

In some implementations, the content metadata can be stored on a storage device in association with a date and time stamp. The date and time stamp can be used to track a history of the radio stations to which a user has tuned, categories of content (e.g., genre of music) to which the user has listened, and for how long. The stored content metadata can be used to identify the user's interests, which can be used by the server to make content recommendations to the user. The stored content metadata can also be presented to the user (e.g., on user interface 220) such that the user can purchase content that has been broadcast from the radio station 102.

In next step 406, the mobile device 120 can present a first user interface 132 for accessing a communication channel connecting the mobile device 120 to a content supplier. The first user interface 132 can include a telephone interface 134 when the mobile device 120 has telephone capabilities, a text-messaging interface 136 when the mobile device 120 has messaging capabilities (e.g., SMS service), or other interfaces (e.g., email, URL link) for connecting to the content supplier. The content supplier can be the radio station 102 that is making the broadcast, or another source of content (e.g., a broadcasting company that controls the radio station, a recording studio, etc.). The telephone number, SMS ID, email address, or URL link can be identified from pre-stored information in a radio station database 130.

In some implementations, a telephone number, an SMS ID, an email address, or a URL link can be identified from the information snippets 124 received on the mobile device 120. The RT data field of an RDS data stream can contain various information, including telephone numbers and so on. In parsing the information snippets 124, the content metadata processor 128 can identify a telephone number (e.g., when a series of numbers is in an xxx-xxx-xxxx format), an email address (e.g., when a series of alphanumeric digits is in an xxx@xxx.com format), or a URL, etc. Such information can be broadcast by a radio station that solicits calls (e.g., a traffic reporting radio station seeking user calls about latest traffic conditions, or a music station providing quizzes and prizes).

In next step 408, the mobile device 120 can open the communication channel in response to a user request. If the user makes a request to communicate with the content supplier (e.g., by tapping on telephone interface 134 on a touch-sensitive display screen of the mobile device 120), the mobile device dials a telephone number that is associated with the content supplier. Similarly, a user can open a virtual keyboard to send a text message, an email editor to edit an email message to the content supplier, or a Web page on the display device.

In next step 410, the mobile device 120 presents a second user interface 220 for displaying the date and time that specific content is played. The user interface 220 can display a history of the radio stations to which a user has tuned and content the user played. The user can configure how long (e.g., how many days) the history goes back. The user can turn the history tracking off. The user can also configure the mobile device 120 such that the user's listening history can be accessed by public. For example, the history can be uploaded to a server such that the server can recommend content to the user based on the history. The history can be shared with specific other users (e.g., by exporting the history to a file and sending the history file to another user). The history can also be made private.

In some implementations where a user's listening history is tracked, a system can use the information to introduce various users to each other in a social network based on similarities in listening histories. For example, the system can maintain a social network where a user can log in with a user ID and password and view profiles of other users who listened to the same broadcast at the same time for more than a few minutes or times.

FIG. 4B is a flowchart illustrating an exemplary process for presenting a user interface on a mobile device 120 to access an advertiser. In a step 452, the mobile device 120 receives a simulcast of a data stream 106 of a radio broadcast 104. The data stream can include information associated with one or more advertisers. In some implementations, the information associated with advertisers can be included in the RT field of RDS data.

In next step 454, the mobile device 120 can extract advertiser information from the data stream 106 while playing content 104 of the radio broadcast. A content metadata processor 128 parses the information snippets 124 extracted from the data stream 106. During the parsing, the content metadata processor 128 can encounter contact information that can include one or more telephone numbers, email addresses, or URLs. The contact information can be about the broadcasting radio station 102. Other contact information can be about advertisers. In some implementations, the content metadata processor 128 ignores distinctions between a content provider and an advertiser, and displays a mixture of contact information from advertisers, radio station, and other information on a user interface (e.g., user interface 210).

In some implementations, the content metadata processor 128 distinguishes an advertiser and a non-advertiser by performing a search. The search can be a query into a radio station database 130. If the contact information (e.g., a phone number) appears in the radio station database 130, and especially when the contact information matches that of the radio station 102 into which the mobile device is tuned, the content metadata processor 128 can presume that the contact information relates to a content provider. If the contact information (e.g., a phone number) does not appear in the radio station database 130, the content metadata processor 128 can presume that the contact information relates to an advertiser. In some implementations, the search can be performed on a search engine on a server (e.g., an Internet search engine) to determine whether a phone number, email address, or URL relates to a content provider or an advertiser. In some implementations where a content provider is an advertiser (e.g., a phone number appears in the content database 130, but is associated with a radio station other than the one to which the mobile device is tuned), the content metadata processor 128 can treat present the content information as contact information related to an advertiser.

In a next step 456, the mobile device 120 presents a browsable user interface to access one or more advertisers in the advertiser information. In some implementations, advertisers are identified and contact information on the advertisers is displayed separately. In some other implementations, the advertiser contact information is displayed mixed with other information related to the content being played on a mobile device 120 on a user interface 210. The user interface is browsable when, for example, a user can scroll up and down (or left and right) a list of advertisers by a gesture by one or more fingers on a touch-sensitive display screen.

Recommending Radio Stations

Figure 5A:
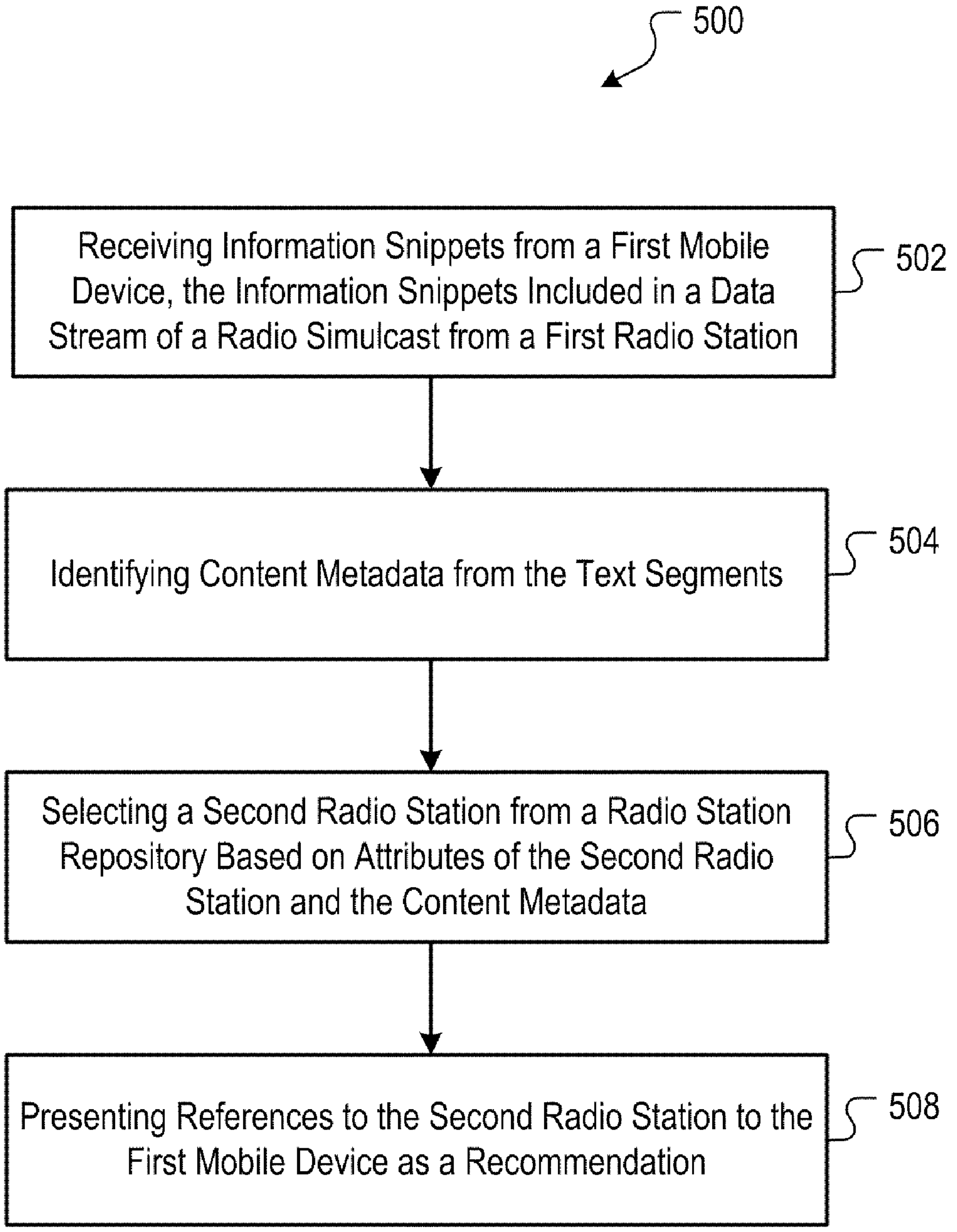
FIGS. 5A and 5B are flowcharts illustrating exemplary processes for recommending radio stations based on content metadata extracted from simulcast data.
Figure 5B:
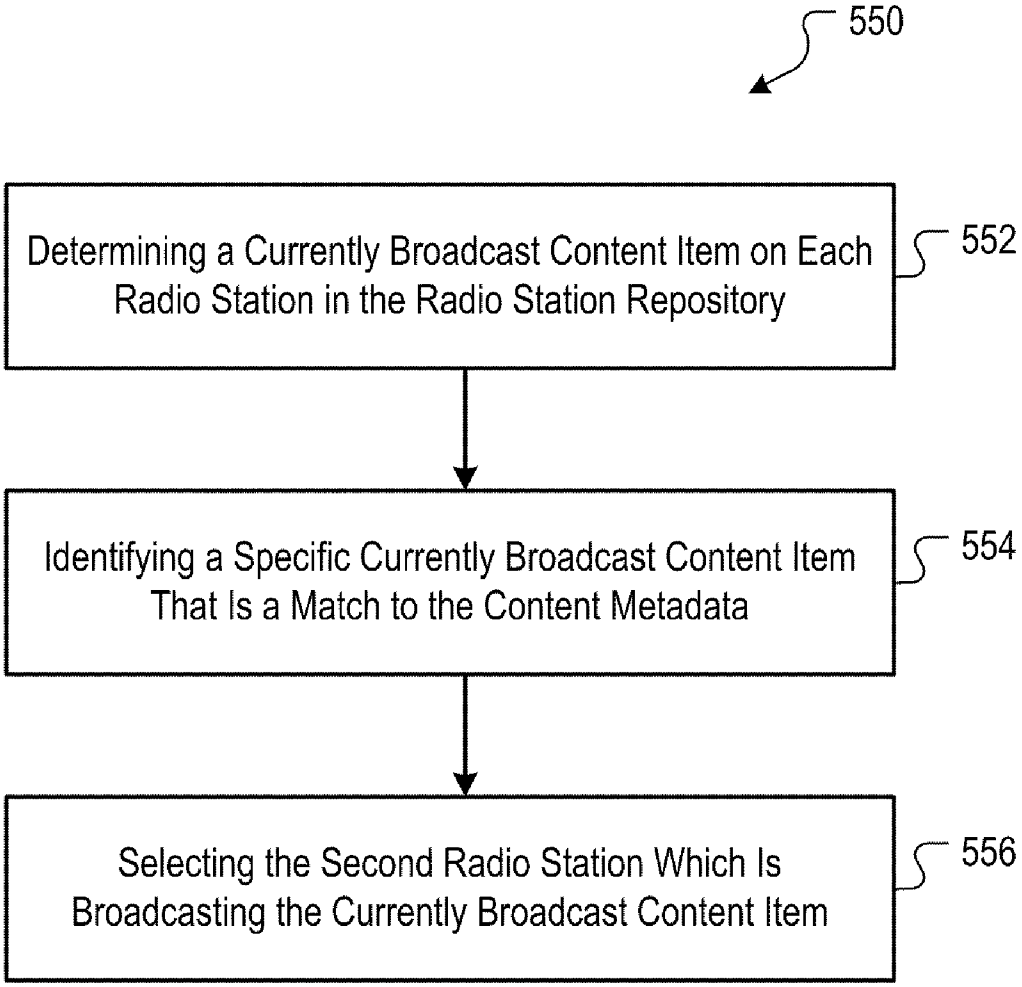

FIGS. 5A and 5B are flowcharts illustrating exemplary processes 500 and 550 for recommending radio stations based on content metadata extracted from simulcast data. FIG. 5A is a flowchart illustrating an exemplary process 500 for recommending a radio station based on a genre identified in content metadata of content currently played on a mobile device 120. For convenience, the example process will be described with respect to a server that implements techniques for processing simulcast data. In FIG. 5A, the server can recommend a radio station to a user based on what the user is listening to.

In step 502, the server receives information snippets 124 from a first mobile device 120. The information snippets 124 are included in a data stream 106 of a radio simulcast received on the first mobile device 120. The simulcast is transmitted from a first radio station 102.

In next step 504, the server can identify content metadata and components of the content metadata from the information snippets 124 received from the first mobile device 120. In some implementations, components of content metadata can include a title of a song being played, a name of a performer playing the song, etc. The information snippets 124 can include a complete title or a name or fragments of the title or the name (e.g., "Bruce Sp" and "ringsteen"). The server can use a search engine as an error correction mechanism to recreate the actual name of the artist from the fragments. In some implementations, the server identifies components of content metadata by performing a search for each information snippet (e.g., search for text segment "Bruce Sp" and for text segment "ringsteen"), and cross-reference the search results (e.g., by identifying URLs that are included in both search result for "Bruce Sp" and search result for "ringsteen" to determine that "Bruce Springsteen" is a component of content metadata). In some implementations, the server performs a search by submitting to a search engine a search query whose terms include a combination of two or more text segments (e.g., "Bruce Sp ringsteen"). The server can identify an artist name that appears at or near the top of search results for the search query, and enters that name as a component of the metadata. The server can identify the term "Bruce Springsteen" as an artist name from the search results by comparing the search results with a content repository 744 that contains a collection of names of artists. The content repository 744 will be described in further detail below with respect to FIG. 7. In addition to the song title and artist name, other components (e.g., program type, radio station name, etc.) can be similarly identified.

In next step 506, the server can select a second radio station from a radio station repository 740. The selection can be based on whether attributes (e.g., a genre) of the second radio station match at least a portion of the content metadata. In some implementations, the second radio station is selected if the genre of the second radio station matches one or more components of the content metadata. A radio station repository 740 can store call signs (e.g., "KIOI"), names (e.g., "K101" which can differ from call signs), frequencies (e.g., "FM 101.3"), locations (e.g., "San Francisco") and genres (e.g., "soft rock"). The server can select from the radio station repository 740 a radio station whose genre matches a component (e.g., program type) in the content metadata. In some implementations, the data stream 106 contains RDS data that includes a program type definition ("PTY") data field that specifies a program type of the currently broadcast content. For example, in RBDS, PTY code 8 can specify that the program type of the currently broadcast content that a user is playing on the mobile device 120 is "soft rock." The server can extract the PTY code from the information snippets 124 and designate "soft rock" as a program type component in the content metadata. The server can identify a radio station whose genre is a match for the program type component in the content metadata (e.g., "KIOI," whose genre is "soft rock") and recommend the radio station to the user.

In some implementations, the radio station recommendation can be based on a geographic location of the radio station and a geographic location of the mobile device 120. The server can select a second radio station that is located in a geographic proximity of the mobile device 120 to recommend to the user. Selections based on geographic proximity can ensure that the mobile device 120 is within a range of clear reception of signals from the radio station recommended. The location of the radio station can be stored in the radio station repository 740. The location can be determined by a postal code (e.g., ZIP code), an address, or geographical coordinates of a latitude and a longitude. The geographic location of the mobile device 120 can be determined by a positioning system 318 (e.g., a Global Positioning System (GPS) receiver) that is built-in or coupled with the mobile device 120. The server can acquire the geographic location of the mobile device 120, for example, by running a polling program or by sending a request to the mobile device 120 when the server needs the location information. For example, the radio station KIOI can be recommended to the user if the genre of KIOI ("soft rock") matches the program type of the content the user is listening to, and if the user is in a location close enough to San Francisco such that the mobile device 120 can receive clear signals from KIOI.

In next step 508, the server presents a reference to the selected second radio station to the first mobile device as recommendations. The name or the call sign of the selected second radio station, as well as the frequency on which the second radio station broadcasts, can be sent to the mobile device 120 as recommendations. The recommended radio stations and frequencies can be displayed on a user interface 240.

FIG. 5B is a flowchart illustrating an exemplary process 550 for recommending a second radio station to a mobile device 120 based on content being broadcast on the second radio station. In some implementations, exemplary process 550 can correspond to a process for selecting a second radio station from a radio station repository 740, described above with respect to FIG. 5A. For convenience, the example process will be described with respect to a server that implements techniques for processing simulcast data.

In step 552, the server determines a currently broadcast content item on each radio station in a radio station repository 740. In some implementations, the currently broadcast content item can be located from radio stations' Web pages. In some implementations, the system can determine the currently broadcast content item for each station by receiving information from a population of mobile devices ("second" mobile devices). For example, the mobile device 120 can be tuned to a radio station KIOE (FM 103.5). The server can extract content metadata from the information snippets 124 sent from mobile device 120 to the server and determine what content (e.g., title of the song, name of the artist, etc.) is playing on radio station KIOE, and the category of the content (e.g., "soft rock"). Similarly, the server can determine what is being broadcast on various radio stations from information snippets sent to the server by other mobile devices. A large number of second mobile devices sending information snippets to a server can be helpful in determining what is playing on a large number of radio stations. The content metadata of the various content can be stored in a currently playing item database 742.

In step 554, the server identifies a specific currently broadcast content item that matches the content being played on the mobile device 120. From a large number of content items being played on various radio stations sent to the server by a large number of mobile devices, the server can select a limited number of content items. To select a specific content item, the server can use a match score that can be calculated base on a number of matches between components of the content metadata of the currently playing content and the components of the content metadata of the specific content item in the currently playing item database 742. For example, if song A and song B have the same program type (e.g., soft rock), are played by the same artist, written by the same composer, in the same time period (e.g., within five years of each other), the system can identify song B as matching content for song A, and song A matching content for song B.

In some implementations, the system limits the selection of matching content to geographic areas of the radio stations. Instead of matching all content from all radio stations in a radio station repository 740, the system can limit the matching of content to matching only content from radio stations in a geographic proximity (e.g., radio stations in San Francisco Bay Area) of the mobile device 120 and radio stations whose signals can be received by the mobile device 120 (e.g., satellite broadcast). Such limitations can reduce the number of content items that the system matches against each other, and improve efficiency of the system.

In some implementations, the system can further use album information to select matching content. The system can consider song A and song B matching each other if song A and song B are included in one or more published albums together. The system can maintain a content repository 744 that can include, for example, music pieces and albums that are bundled and published together by publishers. If two music pieces are in one album, the system can determine that the two pieces are related to each other even if the two pieces do not share a performer, a composer, or a title. For example, an album for a movie soundtrack can include various music pieces from various otherwise unrelated artists. However, the system can consider the music pieces related based on the movie soundtrack album and select the music pieces.

In step 556, the server can select the second radio station that is broadcasting the specific currently broadcast content item. Selecting the second radio station can include retrieving a radio station call sign and frequency from the content metadata that is associated with the selected content item. If the frequency is not included in the content metadata, the system can identify the frequency based on the call sign from a radio station repository 740. The system can send the selected radio station name, call sign, and frequency to the mobile device 120 as recommendations.

Recommending Content

Figure 6:
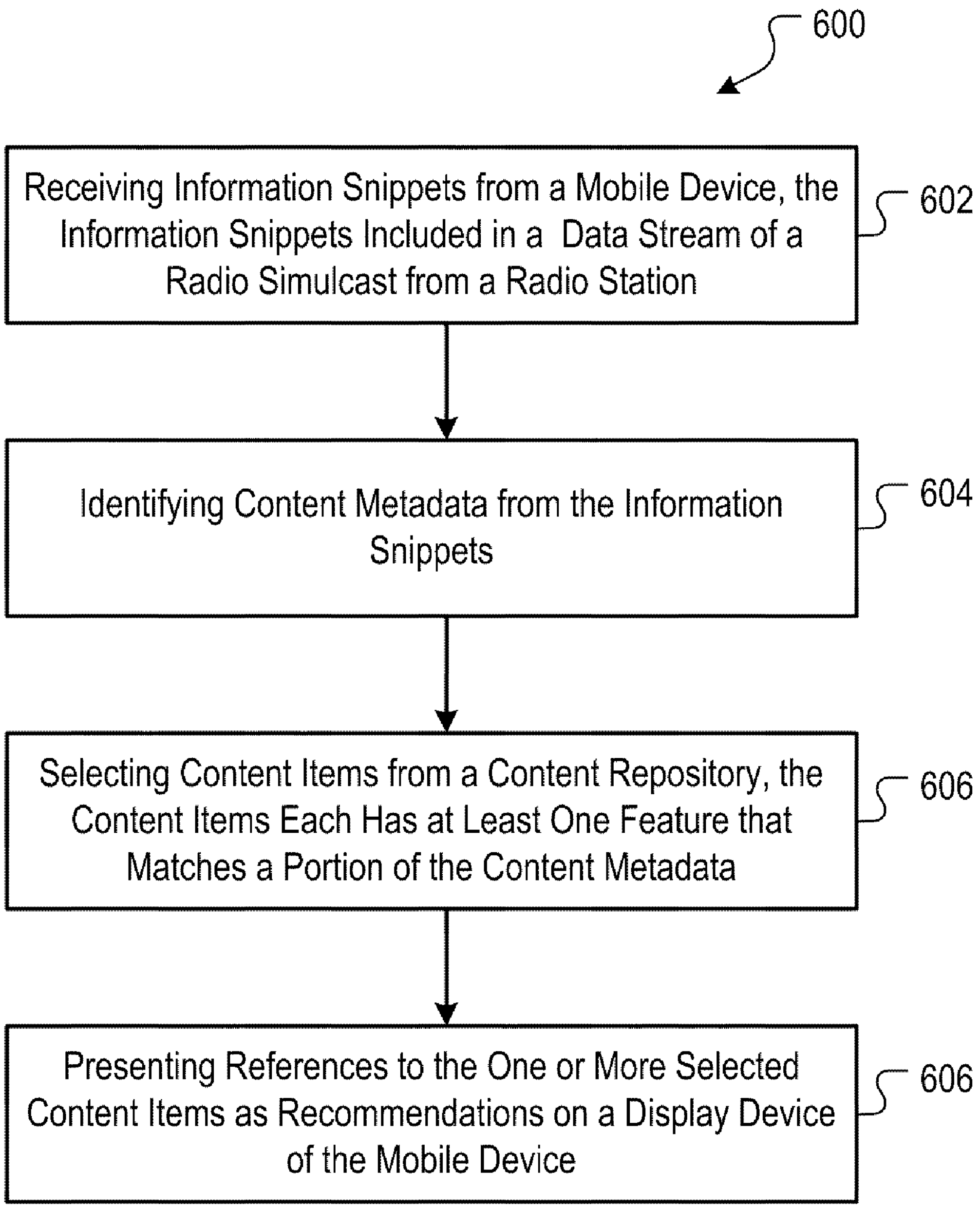
FIG. 6 is a flowchart illustrating an exemplary process for recommending content based on content metadata extracted from simulcast data.

FIG. 6 is a flowchart illustrating an exemplary process for recommending content based on content metadata extracted from simulcast data. For convenience, the example process will be described with respect to a server that implements techniques for processing simulcast data and recommending content.

In step 602, the server receives information snippets 124 from a mobile device 120. The information snippets 124 are included in a data stream 106 of a radio simulcast received on the mobile device 120. The simulcast is transmitted from a radio station 102.

In step 606, the server can select one or more content items from a content repository 744. Each selected content item has at least one feature that matches at least a portion of the content metadata. The content stored in the content repository 744 can be associated with various features of the content, for example, category (e.g., classical, jazz, talk), performer (e.g., Bruce Springsteen), composer, time period, etc. The features can have sub-features (e.g., a "rock" category can have subcategories "soft rock," "classic rock," etc.). The system can maintain one or more indices on the features and sub-features. Given a particular feature, the system can use the indices to identify from the content repository 744 one or more content items that have the particular feature. The system can match the various components of the content metadata to the features in the index to identify content items that features at least one component of the content metadata. The number of components that are matched can be used to calculate a match score that measures a degree of match.

In some implementations, the system can match a component in the content metadata to various features in the content repository 744. For example, the content metadata can include a name "Bruce Springsteen." The system can match the name "Bruce Springsteen" to a performer, a composer, or both a performer and a composer in the content repository 744. Content that is both composed and performed by Bruce Springsteen can have a higher degree of match and receive a higher match score. Content that has high match scores can be selected as recommendation candidates.

In some implementations, selecting content from content repository 744 can further include filtering the recommendation candidates by the content that a user has already downloaded to a user library. A user can download various content from the server to create a user library and store the user library on the mobile device 120. If the user has already downloaded a particular content item (e.g., song "Tenth Avenue Freeze-Out" by Bruce Springsteen), the system can refrain from recommending the content item because the user may not wish to download or purchase a song that the user already owns.

In some implementations, to determine whether the user has already downloaded a particular content item, the system can obtain a user library catalog 746. The server can store a catalog 746 of the user's downloaded content. The server can synchronize the stored catalog 746 periodically according to a predetermined time interval, synchronize the stored catalog 746 when the user downloads new content, or synchronized the stored catalog 746 upon request from the user or upon an event that triggers a synchronization (e.g., when the user reboots the mobile device 120).

In step 608, the server presents references (e.g., links to an online music store) to the one or more selected content items as recommendations on a user interface 230 on a display device of the mobile device 120. The references displayed can be actionable (e.g., a user can click on input area 232 or 234 to purchase the recommended content.

Figure 7:
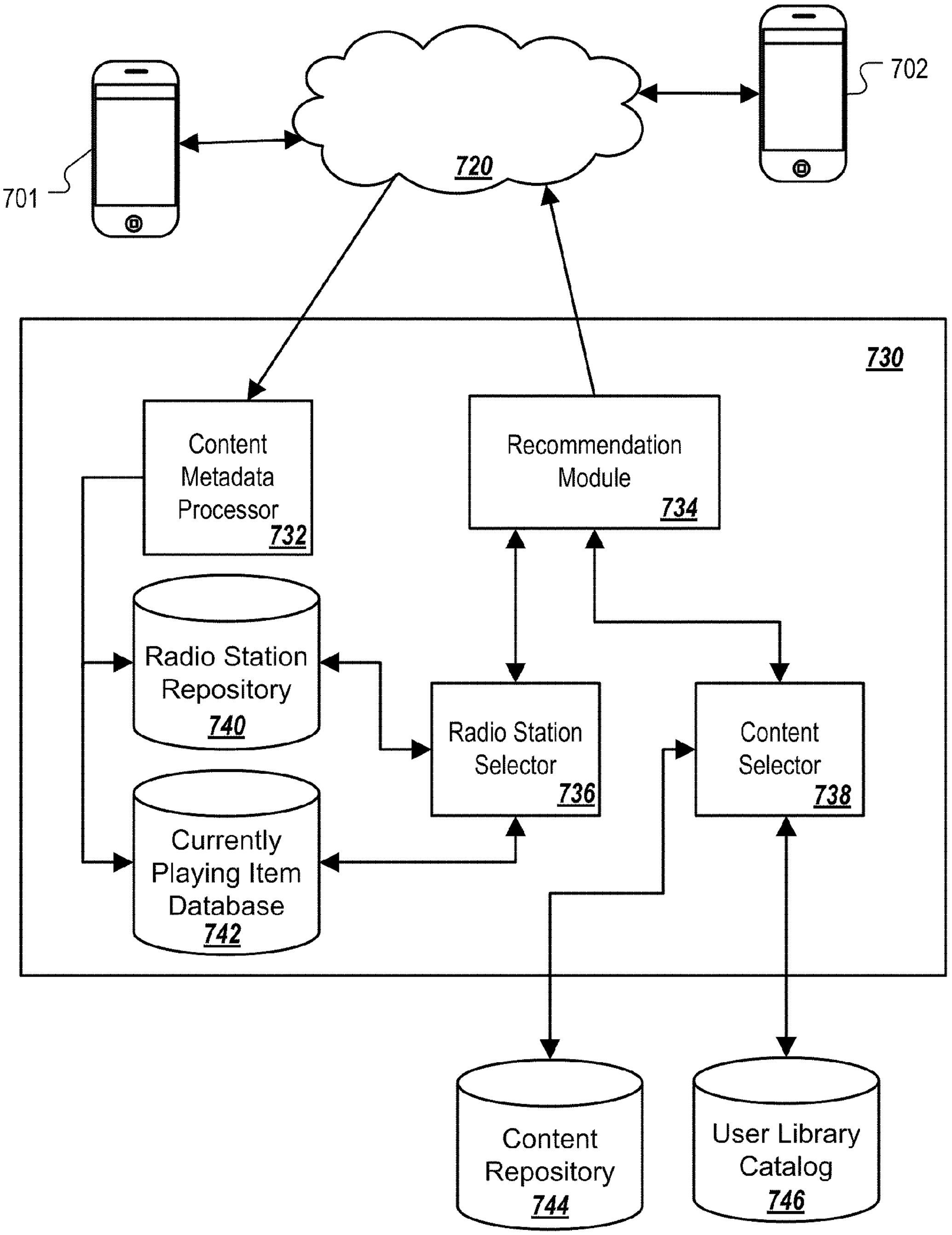
FIG. 7 is a block diagram illustrating an exemplary system for recommending radio stations and content based on content metadata extracted from simulcast data.

FIG. 7 is a block diagram illustrating an exemplary system for recommending radio stations and content based on content metadata extracted from simulcast data. Example mobile devices 701 and 702 are mobile devices that are equipped with or can be coupled to an RF receiver 121 that can receive radio broadcast and a simulcast data stream. In some implementations, mobile devices 701 and 702 can correspond to the mobile device 120 described above with respect to FIGS. 1 and 2A-2D. Mobile devices 701 and 702 can extract information snippets 124, for example, from RDS data in the radio broadcast, while playing content of the radio broadcast. Mobile devices 701 and 702 can identify radio stations making the broadcast and provide user interfaces for identifying and opening communication channels (e.g., a user interface for a one-touch virtual phone dial pad) to the identified radio stations.

The mobile devices 701 and 702 can be connected to each other and to a content metadata service 730 through a communications network 720. The content metadata service 730 can be hosted on one or more computers, virtual machines, or mobile devices. The content metadata service 730 can include one or more content metadata processors 732. In some implementations, the information snippets 124 are sent from a mobile device 701 to the content metadata processors 732. The content metadata processor 732 extracts various components of the content metadata. Some example components include but are not limited to: category of the content of the radio broadcast playing on the mobile device 701, title of the content, artists playing the content, time period of the content, author or composer of the content, producers, directors and stars of the content if the content is a movie, etc.

A radio station repository 740 in the content metadata system 730 can store information on radio stations. The information can include a radio station's call sign, name genre, location, contact information (e.g., one or more phone numbers, email addresses, etc.). In some implementations, the radio station repository 740 can be synchronized with a radio station database 130 on a mobile device 701 or 702 periodically, upon user request, or upon rebooting the mobile device 701 or 702. In some implementations, the content metadata processor 732 can update the radio station repository 740. An update to the radio station repository 740 can occur, for example, when a mobile device receives a new phone number to a radio station.

A content metadata service 730 can include a currently playing item database 742. The currently playing item database 742 can be used in various implementations for recommending radio stations broadcasting content similar to what a user is listening, for example, in process 550 described above with respect to FIG. 5B. In some implementations, the content metadata processor 732 can update the currently playing item database 742. The content metadata processor 732 can receive information snippets 124 from numerous mobile devices, the information snippets 124 extracted by one or more processors (e.g., RDS processors 122) from simulcast data streams of numerous radio broadcast from numerous radio stations. The broadcast content from each radio station can be recorded in the currently playing item database 742 and updated when the radio station broadcasts new content.

A content metadata service 730 can include a recommendation module 734, which can recommend radio stations or content to various mobile devices 701 and 702. A radio station selector 736 can select various radio stations to recommend to a particular mobile device 702 based on which radio station mobile device 702 has tuned to and what content a user is listening to on mobile device 702.

A radio station selector 736 can be used to select radio stations for recommendation to a user. Recommending radio stations can include selecting radio stations from radio station repository 740 based on a genre of a radio station. Recommending radio stations can also include identifying currently playing content items from the current playing item database 742 based on the content to which the user is listening. Example implementations of processes for recommending radio stations are described above with respect to FIGS. 5A and 5B.

A content selector 738 can be used to select content for recommending to a user. The content selector 738 can select content from a content repository 744 based on a match between the content in the content repository 744 and the broadcast content to which the user is listening on the mobile device 702. In some implementations, the content selector 738 can use a user library catalog 746 to filter out content that is a good match but is already downloaded by the user into a user library. Example implementations of processes for recommending content to a user are described above with respect to FIG. 6.

The recommendation module 734 can send information on the radio stations selected by the radio station selector 736 (e.g., radio station name, call sign, and frequency), or the content (e.g., an URL link to a download site) selected by the content selector 738, to the mobile device 701 or 702 through communications network 720. The mobile device 701 or 702 can display the information in various formats. The information displayed in some example user interfaces is described above in further detail with respect to FIGS. 2A-2D.

Network Operating Environment

Figure 8:
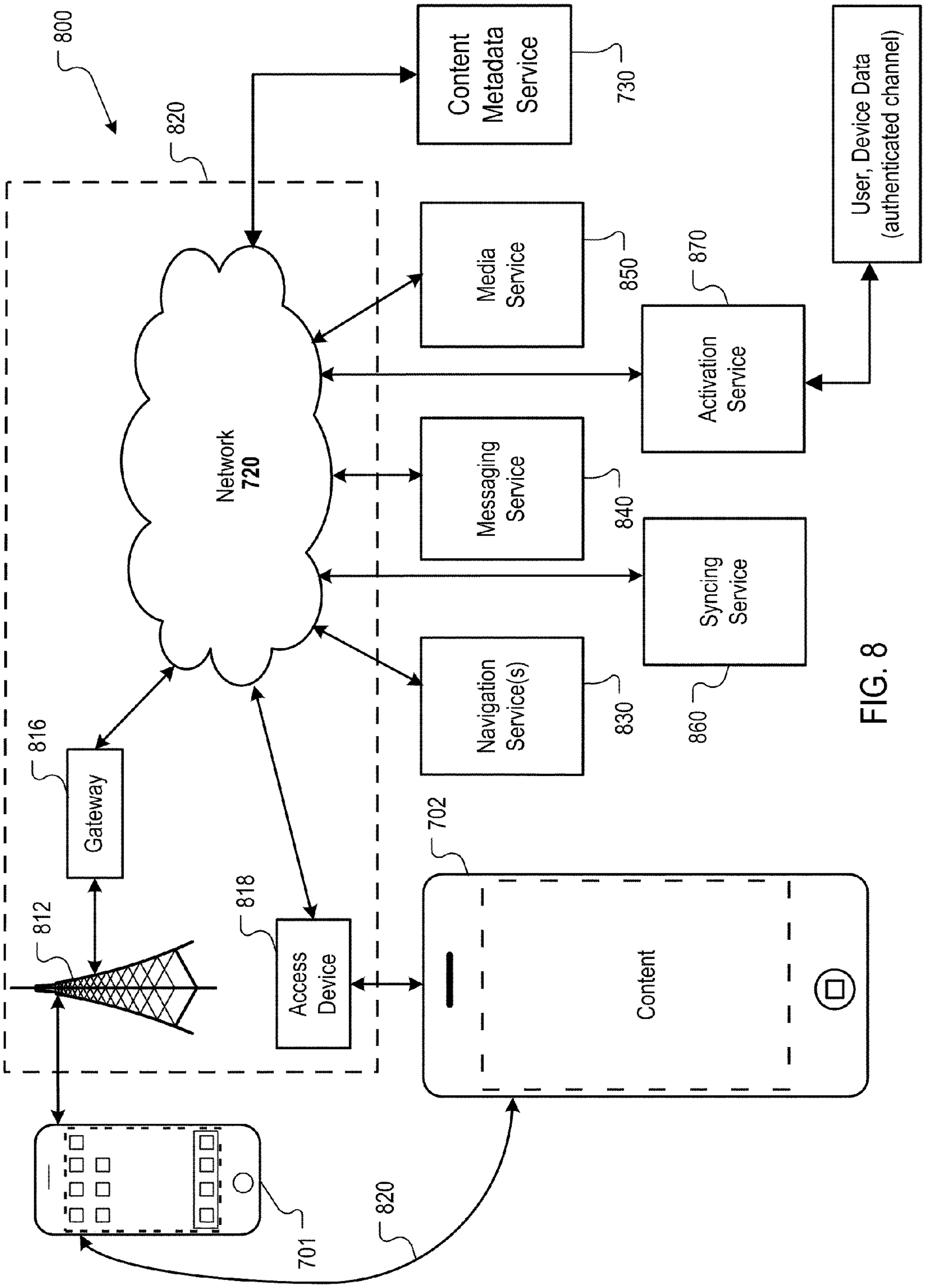
FIG. 8 is a block diagram of an example network operating environment for a mobile device and a system for processing simulcast data.

FIG. 8 is a block diagram of an example network operating environment 800 for a mobile device. The mobile device 120 of FIG. 1 can be mobile device 701 or 702 in the example network operating environment 800. Mobile devices 701 or 702 can communicate over one or more wired and/or wireless networks in data communication. For example, a wireless network 812, e.g., a cellular network, can communicate with a wide area network (WAN) 720, such as the Internet, by use of a gateway 816. Likewise, an access point device 818, such as an 802.11g wireless access point device, can provide communication access to the wide area network 720. In some implementations, both voice and data communications can be established over the wireless network 812 and the access point device 818. For example, the mobile device 701 can place and receive phone calls (e.g., using VoIP protocols), send and receive e-mail messages (e.g., using POP3 protocol), and retrieve electronic documents and/or streams, such as web pages, photographs, and videos, over the wireless network 812, gateway 816, and wide area network 720 (e.g., using TCP/IP or UDP protocols). Likewise, the mobile device 702 can place and receive phone calls, send and receive e-mail messages, and retrieve electronic documents over the access point device 818 and the wide area network 720. In some implementations, the mobile device 702 can be physically connected to the access point device 818 using one or more cables and the access point device 818 can be a personal computer. In this configuration, the mobile device 702 can be referred to as a "tethered" device.

The mobile devices 701 and 702 can also establish communications by other means. For example, the wireless device 701 can communicate with other wireless devices, e.g., other wireless devices 701 and 702, cell phones, etc., over the wireless network 812. Likewise, the mobile devices 701 and 702 can establish peer-to-peer communications 820, e.g., in a personal area network, by use of one or more communication subsystems, such as a Bluetooth™ communication device. Other communication protocols and topologies can also be implemented.

The mobile devices 701 and 702 can, for example, communicate with one or more services 730, 830, 840, 850, and 860 and/or one or more content publishers 870 over the one or more wired and/or wireless networks 720. For example, a navigation service 830 can provide navigation information, e.g., map information, location information, route information, and other information, to the mobile devices 701 and 702. In the example shown, a user of the mobile device 702 can invoke a map functionality, e.g., by pressing a maps object on a graphical user interface and can request and receive a map for a particular location (e.g., "100 NE Center Street, Peoria, Ill.")

A mobile device 701 or 702 can include a component that enables the mobile device 701 or 702 to receive broadcast from radio stations. The mobile device 701 or 702 can include a component for demodulating and extracting simulcast data stream (e.g., under the RDS protocol). The mobile device 701 or 702 can include a radio station database that contains contact information (e.g., phone number, SMS ID, email address, etc.). The mobile device 701 or 702 can have functions that present and open a communication channel to a radio station whose broadcast content the mobile device 701 or 702 is playing.

A messaging service 840 can, for example, provide e-mail and/or other messaging services. A media service 850 can, for example, provide access to media files, such as song files, movie files, video clips, and other media data. An application repository can, for example, store a repository of application programs and recommend the application programs for downloads. One or more other services 860 can also be utilized by the mobile devices 701 and 702.

A content metadata service 730 can, for example, provide services for parsing information snippets send to the service 730 from the mobile devices 701 and 702, identifying components of content metadata from the information snippets, and recommending radio stations and content based on the content metadata.

The mobile devices 701 and 702 can also access other data and content over the one or more wired and/or wireless networks 720. For example, content publishers 870, such as news sites, RSS feeds, web sites, blogs, social networking sites, developer networks, radio stations, etc., can be accessed by the mobile devices 701 and 702. Such access can be provided by invocation of a web browsing function or application (e.g., a browser) in response to a user touching the Web object 210.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode for implementing the subject matter described and provides examples to describe the subject matter and to enable a person of ordinary skill in the art to make and use the subject matter. This written description does not limit the subject matter to the precise terms set forth. Thus, while the subject matter has been described in detail with reference to the examples set forth above, those of ordinary skill in the art may effect alterations, modifications and variations to the examples without departing from the scope of the subject matter.

What is claimed is:

1. A computer-implemented method comprising:

receiving information snippets from a first mobile device, the information snippets included in a data stream of a radio simulcast received on the first mobile device from a first radio station;

identifying content metadata from the information snippets;

identifying a second radio station based on attributes of content being broadcast on the second radio station, where the attributes of the content being broadcast on the second radio station match at least a portion of the content metadata; and providing a reference to the second radio station to the first mobile device as a recommendation.

2. A computer-implemented method comprising:

receiving information snippets from a first mobile device, the information snippets included in a data stream of a radio simulcast received on the first mobile device from a first radio station;

identifying content metadata from the information snippets;

determining a currently playing content item on a second radio station using content metadata received from a second mobile device tuned to the second radio station;

identifying an attribute of the currently playing content item, the attribute matching at least a portion of the content metadata identified from the information snippets from the first mobile device; and providing, based the content item currently playing on the second radio station, a reference to the second radio station to the first mobile device as a recommendation.

3. A non-transitory computer-readable medium having instructions stored thereon, which, when executed by a processor, causes the processor to perform operations comprising:

receiving information snippets from a first mobile device, the information snippets included in a data stream of a radio simulcast received on the first mobile device from a first radio station;

identifying content metadata from the information snippets;

determining a currently playing content item on a second radio station using content metadata received from a second mobile device tuned to the second radio station;

identifying an attribute of the currently playing content item, the attribute matching at least a portion of the content metadata identified from the information snippets from the first mobile device; and providing, based the content item currently playing on the second radio station, a reference to the second radio station to the first mobile device as a recommendation.

4. A system, comprising:

a processor; and a non-transitory computer-readable medium having instructions stored thereon, which, when executed by the processor, cause the processor to perform operations comprising:

receiving information snippets from a first mobile device, the information snippets included in a data stream of a radio simulcast received on the first mobile device from a first radio station;

identifying content metadata from the information snippets;

determining a currently playing content item on a second radio station using content metadata received from a second mobile device tuned to the second radio station;

identifying an attribute of the currently playing content item, the attribute matching at least a portion of the content metadata identified from the information snippets from the first mobile device; and providing, based the content item currently playing on the second radio station, a reference to the second radio station to the first mobile device as a recommendation.

5. The method of claim 2, wherein the content metadata includes one or more of a program type of content in the simulcast, a title of the content, a name of a performer of the content, a composer of the content, and a program service name identifying the first radio station.

6. The method of claim 2, wherein identifying the second radio stations comprises selecting a second radio station that is located in a geographic proximity of the first mobile device.

7. The method of claim 1, wherein identifying the second radio station comprises:

determining a currently playing content item on each radio station in a radio station repository using content metadata received from a second mobile device tuned to the each radio station;

identifying a specific currently broadcast content item that is a match to at least a portion of the content metadata identified from the information snippets from the first mobile device; and selecting the second radio station which is broadcasting the specific currently broadcast content item.

8. The method of claim 2, wherein providing the reference to the second radio station comprises sending a name and a radio frequency of the second radio station to the first mobile device through a communications network.

9. A computer-implemented method comprising:

receiving information snippets from a mobile device, the information snippets included in a data stream of a radio simulcast received on the mobile device from a radio station;

identifying content metadata from the information snippets;

identifying one or more content items from a content repository based on a feature of each of the one or more content items, when the feature of the corresponding content item matches at least a portion of the content metadata; and providing references to the one or more selected content items to the mobile device as recommendations.

10. The method of claim 9, wherein identifying the one or more content items from the content repository comprises selecting the content items from a user library, the selecting comprising comparing features in a catalog of the user library to portions of the content metadata.

11. The method of claim 9, wherein providing references to the one or more selected content items further comprises offering the content items for purchase.

12. A non-transitory computer-readable medium having instructions stored thereon, which, when executed by a processor, causes the processor to perform operations comprising:

receiving information snippets from a first mobile device, the information snippets included in a data stream of a radio simulcast received on the first mobile device from a first radio station;

identifying content metadata from the information snippets;

identifying a second radio station based on attributes of content being broadcast on the second radio station, where the attributes of the content being broadcast on the second radio station match at least a portion of the content metadata; and providing a reference to the second radio station to the first mobile device as a recommendation.

13. The non-transitory computer-readable medium of claim 3, wherein the content metadata include one or more of a program type of content in the simulcast, a title of the content, a name of a performer of the content, a composer of the content, and a program service name identifying the first radio station.

14. The non-transitory computer-readable medium of claim 3, wherein identifying the second radio stations comprises selecting a second radio station that is located in a geographic proximity of the first mobile device.

15. The non-transitory computer-readable medium of claim 12, wherein identifying the second radio station comprises:

determining a currently playing content item on each radio station in a radio station repository using content metadata received from a second mobile device tuned to the each radio station;

identifying a specific currently broadcast content item that is a match to at least a portion of the content metadata identified from the information snippets from the first mobile device; and selecting the second radio station which is broadcasting the specific currently broadcast content item.

16. The non-transitory computer-readable medium of claim 3, wherein providing the reference to the second radio station comprises sending a name and a radio frequency of the second radio station to the first mobile device through a communications network.

17. A non-transitory computer-readable medium having instructions stored thereon, which, when executed by a processor, causes the processor to perform operations comprising:

receiving information snippets from a mobile device, the information snippets included in a data stream of a radio simulcast received on the mobile device from a radio station;

identifying content metadata from the information snippets;

identifying one or more content items from a content repository based on a feature of each of the one or more content items, when the feature of the corresponding content item matches at least a portion of the content metadata; and providing references to the one or more selected content items to the mobile device as recommendations.

18. The non-transitory computer-readable medium of claim 17, wherein identifying the one or more content items from the content repository further comprises selecting the content items from a user library, the selecting comprising comparing features in a catalog of the user library to portions of the content metadata.

19. The non-transitory computer-readable medium of claim 17, wherein providing references to the one or more selected content items further comprises offering the content items for purchase.

20. A system, comprising:

a processor; and a non-transitory computer-readable medium coupled to the processor and having instructions contained thereon, which, when executed by a processor, cause the processor to perform operations comprising:

receiving information snippets from a first mobile device, the information snippets included in a data stream of a radio simulcast received on the first mobile device from a first radio station;

identifying content metadata from the information snippets;

identifying a second radio station based on attributes of content being broadcast on the second radio station, where the attributes of content being broadcast on the second radio station match at least a portion of the content metadata; and providing a reference to the second radio station to the first mobile device as a recommendation.

21. The system of claim 4, wherein the content metadata include one or more of a program type of content in the simulcast, a title of the content, a name of a performer of the content, a composer of the content, and a program service name identifying the first radio station.

22. The system of claim 4, wherein identifying the second radio stations comprises selecting a second radio station that is located in a geographic proximity of the first mobile device.

23. The system of claim 20, wherein identifying the second radio station comprises:

determining a currently playing content item on each radio station in a radio station repository using content metadata received from a second mobile device tuned to the each radio station;

identifying a specific currently broadcast content item that is a match to at least a portion of the content metadata identified from the information snippets from the first mobile device; and selecting the second radio station which is broadcasting the specific currently broadcast content item.

24. The system of claim 4, wherein providing the reference to the second radio station comprises sending a name and a radio frequency of the second radio station to the first mobile device through a communications network.

25. A system, comprising:

a processor; and a computer-readable medium coupled to the processor and having instructions contained thereon, which, when executed by a processor, cause the processor to perform operations comprising:

receiving information snippets from a mobile device, the information snippets included in a data stream of a radio simulcast received on the mobile device from a radio station;

identifying content metadata from the information snippets;

identifying one or more content items from a content repository based on a feature of each of the one or more content items, when the feature of the corresponding content item matches at least a portion of the content metadata; and providing references to the one or more selected content items to the mobile device as recommendations.

26. The system of claim 25, wherein identifying the one or more content items from the content repository comprises selecting the content items from a user library, the selecting comprising comparing features in a catalog of the user library to portions of the content metadata.

27. The system of claim 25, wherein providing references to the one or more selected content items further comprises offering the content items for purchase.

* * * * *